Sept. 2, 1952  E. C. FICHTNER  2,609,316
THERMOSEALING DEVICE AND SOLE THEREFOR
Filed Aug. 2, 1949
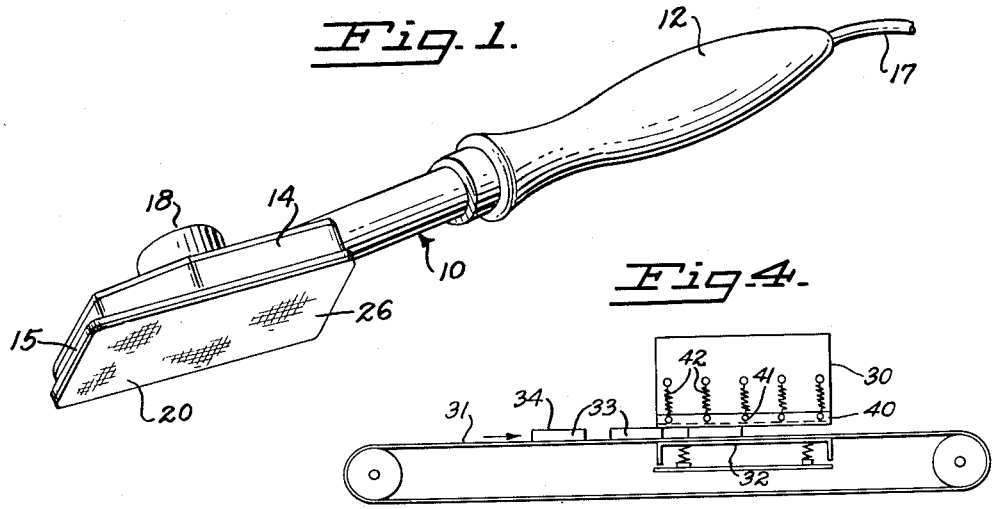
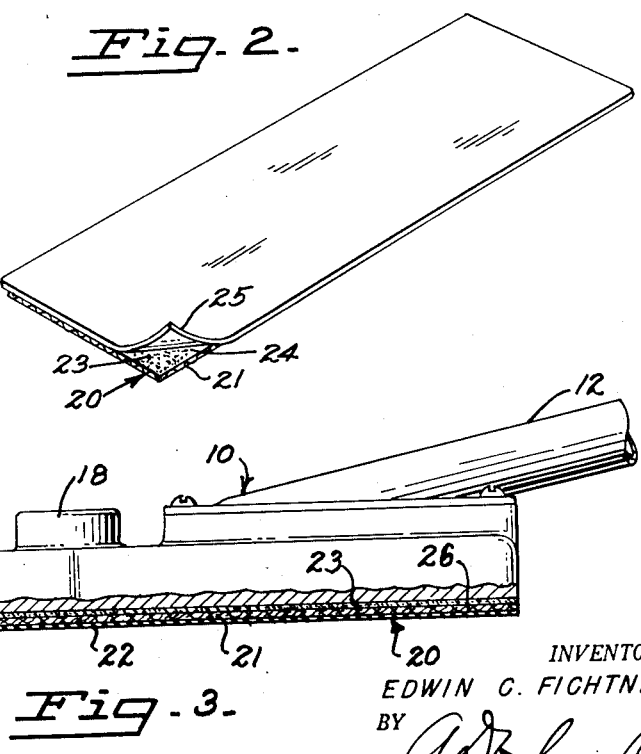
INVENTOR.
EDWIN C. FICHTNER
BY
ATTORNEY Patented Sept. 2, 1952

2,609,316

UNITED STATES PATENT OFFICE 2,609,316

THERMOSEALING DEVICE AND SOLE THEREFOR

Edwin C. Fichtner, Burlingame, Calif., assignor to Wells Manufacturing Company, San Francisco, Calif., a corporation of California Application August 2, 1949, Serial No. 108,210

2 Claims. (Cl. 154—42)

This invention relates to a thermosealing device and particularly to a device having a sealing surface to which fused or melted plastic materials such as Pliofilm and polyethylene will not stick. It also relates to an article which can be applied to the sealing surface of thermosealing devices to prevent such sticking.

This invention solves the problem of how to seal containers such as bags made from Pliofilm, polyethylene, waxed paper, and similar thermoplastic or thermosealable materials. In the past, when heated surfaces have been used to seal such bags by fusing or heat-sealing the open end together, there has been a great deal of trouble with the thermoplastic materials sticking to the heated surface of the sealing device. When this happens, the bag is ruined and the surface of the device must be cleaned off thoroughly before it can safely be used again. For this reason the temperature of the sealing surface has been very critical. When the sealing surface has not been at exactly the critical temperature, the results are bad. If the plastic or other material being sealed is too cold, it will not melt or fuse; if it is heated too much some of it will stick to the iron.

However, the temperature trouble was not the only problem. In fact thermostatically controlled surfaces failed to solve the problem because even when the temperature of the surface was perfect the materials being sealed still stuck to it when they melted or fused. The operator had to be careful to move the iron across the plastic at an exact rate of speed which would seal the bag without causing the material to stick to the iron, and he also had to be careful to press with exactly the right amount of pressure. There was no way to determine this rate of speed or this amount of pressure; it was just done by the operator's guess work and experience, and even this did not prevent the spoiling of many containers. One result was that many of the containers leaked due to improper or discontinuous sealing. For frozen foods and several other types of merchandise such leakage is a serious matter and results in spoilage of the enclosed merchandise.

One further problem is that while there are materials which can be put on sealing surfaces to prevent sticking, these materials have heretofore been characterized by very unsatisfactory qualities which have prevented their adoption and use. Oils and greases, for example, smear the material being sealed, and where foods are packed they tend to adulterate the food. Also, they soon come off and then the iron or platen sticks again.

This invention solves the sticking problem by providing a sole for a thermosealing device which will transmit the heat from the iron to fuse the plastic but will not itself stick to tacky melted plastic or other sealing materials nor stain nor smear them. With this invention, the range of usable temperatures is much broader than with prior art sealing devices, and the speed of movement and amount of pressure do not seem to matter at all.

In accordance with U. S. Revised Statutes Section 4888, a detailed description of the device follows. This description is illustrative and specific so that anyone skilled in the art can construct a thermosealing device and a sole which will perform in accordance with the invention, but the scope of the invention itself is defined by the appended claims.

In the drawings:

Fig. 1 is a view in perspective from below of a thermosealing iron embodying the principles of the invention;

Fig. 2 is an enlarged view of the sole added to the iron, or other sealing device, showing an adhesive-protecting sheet, which may be used to protect the adhesive during shipment; this sheet is shown partly stripped off;

Fig. 3 is an enlarged view partly in section, of the bottom of the iron and the sole; and Fig. 4 is a view in elevation, somewhat diagrammatic in nature showing a platen-type thermosealing device embodying the principles of the invention, used with a conveyor line to seal containers.

As will appear from the following description any type of sealing device may be used, whether it is an iron, platen, or any other heated surface used for sealing. The invention involves the combination therewith of a novel sole which is coated or otherwise prepared so as to prevent sticking to the goods being sealed. The sole may be attached to the bottom, top, side or anywhere else on the sealing device, depending where the sealing is done. It may be secured there by adhesive, by clamps, by sewing, by bolts, by studs, by enclosing the sealing device in a sock, by holding it there or by any other possible way. It may even work without being secured merely by interposing it between the device and the work. All that is needed to practice the invention is this specially prepared sole in or out of combination with a heat sealing device. Two embodiments are described in detail.

Fig. 1 shows an iron 10 having a handle 12, a body 14, and a bottom heating surface 15. The surface 15 of the iron is heated by conduction from an electric element (not shown) inside the body 14 when the cord 17 is connected to a suitable electric outlet. Preferably there is a thermostat 18, which may be of any appropriate well-known type to keep the temperature substantially constant.

The novel sole 20 is here shown as adhesively secured to the lower surface 15 of the iron 10, though it could be secured there in any other manner. The adhesive method of attachment is one good method, because the sole can be sold as an entity all prepared and ready to be stuck on. The sole 20 comprises a non-inflammable base 21 capable of standing high temperatures and impregnated with a material 22 which is incompatible with plastics.

The base 21 is preferably woven glass fabric. Asbestos fibre may be used, but the results are not as good as those given by glass. The upper surface 23 of the base 21 is here shown coated with an adhesive material 24 which secures it firmly to the bottom surface 12 of the iron 10. This adhesive 24 is not necessary but is a convenient form of the invention. Preferably the material 24 is one of the well known synthetic adhesives, but any material which will bond glass cloth to metal may be used and it may be put on the base 21 at the factory or at the time the sole 20 is applied to the surface 12. A satisfactory base 21 may be made from the B & B special tape supplied by Bauer and Black Company of Chicago. This is glass cloth with the adhesive on one side covered by a polyethylene separator 25, to protect the adhesive 24 until it is placed on the bottom of the iron. When the time comes to resurface the iron, it is first prepared by a thorough cleaning, including sanding if necessary. Then the polyethylene film 25 is peeled off (see Fig. 2) and thrown away, and the adhesive side 24 of the base 21 is placed on the surface 15 of the iron 10 while the iron is still cold. Then the iron is heated gradually to about 400° and left at that temperature for about 15 minutes so that the adhesive 24 is properly bonded or vulcanized.

The glass fabric base 21 would stick to Pliofilm and other plastic materials when the Pliofilm was melted if the base were not treated. This invention adds to the non-adhesive side 26 of the base 21 a lubricant 22 which is incompatible with rubber and plastics. This lubricant must be a material which will not stick to Pliofilm, polyethylene, or similar materials when they are softened by heating. When used with an adhesively applied sole it must not loosen the adhesive 24 which holds the fabric sole 20 securely to the iron. The material must also not come off and smear the material being sealed, nor can a material be used which wears off too soon.

The preferable material is a silicone material such as an oil or mold release agent. One example of a suitable material is that sold by Dow-Corning Corporation under the name Mold Release Fluid. This substance is a water clear 100% silicone oil. It is practically inert and non-volatile, with a flash point better than twice as high as the fusing or molding temperatures for plastics. It is insoluble in water and is incompatible with rubber and plastics. If this fluid is too thick, it may be diluted with toluene or other suitable solvents. It is applied by rolling or brushing the liquid on the base 21 either before or after the sole has been affixed, but preferably before. It works into the glass fibres without loosening the adhesive 24 on the other side of the glass fabric, but care must be taken that it does not coat the sticky side of the adhesive 24 and thereby prevent it from sticking to the iron. The sole 20, completely impregnated or coated with the lubricant 22, is often sold as a unit for replacement or affixation on the iron or other sealing device. When an adhesively coated sole 20 is used, the polyethylene sheet 25 is left on until the sole 20 is actually ready to be applied to the sealing device.

This silicone lubricant 22 cannot be applied directly to a metal surface, because (although it may work once or twice) it soon would come off, and the surface would then stick again. That is the function of the glass cloth base 21: to retain the silicone lubricant 22 for repeated use. This type of a sole 20 can be used thousands of times before replacement and will not stick during that time.

In applying the lubricant 22, care must be taken to get a very thin coating or impregnation, so that there will be no excess to come off on the goods being sealed. Most silicone greases, oils, resins, and rubbers are less satisfactory than mold release fluid, though they can be used so long as they can be thinned sufficiently to be applied in a sufficiently thin film.

When the silicone oil 22 has impregnated the base 21, and coated the outer face 26, it acts to repel the melted or softened plastic materials, and there is no chance of any sticking during the sealing operation. To use the sealing iron 10 all that need be done is to plug in the cord 17 to a suitable electric outlet. When it heats up to the molding or fusing temperature of the plastics or other materials being sealed, it is ready to use. The thermostat 18 is convenient but not necessary because with this invention maintenance of a given temperature is not critical, as it has been heretofore. When the temperature is high enough, the soled iron 10 is moved over the surface which it is desired to seal or fuse. The heat transmitted from the iron through the sole 20 acts to melt the plastic, while the silicone lubricant 22 repels the melted plastic from the bottom surface 26 of the sole. The iron can be moved over the plastic as slowly as desired, without causing sticking which is something that could not be done heretofore. Until the present invention it was a job requiring great skill to seal plastics without injury to at least some of them. Now the element of skill is gone and any one can do the job because careful timing and correct temperatures are not factors anymore.

Fig. 4 shows a modified form of the invention. Here, a platen 30, heated by any desired means such as electricity, steam, or gas flame, is shown positioned above a portion of a conveyor belt 31. A spring-pressed cold platen 32 is located beneath the belt 31 and directly opposite the hot platen 30. When the containers 33 pass between the platens 30 and 32, their upper surfaces 34 are subjected to heat under pressure.

The sole 40 here employed is like the sole 20 in all respects except that it is much larger and has no adhesive coating. The lubricant 22 still coats or permeates the glass cloth base 21 to prevent the containers from sticking. The sole 40 in this instance has reinforced eyes 41 along each edge, or at least two opposite edges. The eyes 41 on at least one side of the sole 40 may be secured to springs 42 anchored on the platen 30.

The eyes 41 on the other side may be held by studs (not shown) or by springs identical with the springs 42.

In operation, the belt 31 moves the containers 33 between the platens 30 and 32. The heat from the platen 30 passing through the sole 40 seals the containers as they pass. The lubricant 22 prevents any plastic (or other sealed material) from sticking to the sole 40 so that the motion is even and continuous and there is no jerking or other interference with the securing of a complete seal without any leaks. As before, the temperature, speed, and pressure are not critical so long as they are within rather broad limits. The sole 40 eliminates the factors which would make them critical.

I claim:

1. A thermosealing device for closing thermoplastically sealed containers comprising an iron having a smooth sealing surface, a sole comprising a glass fabric sheet, a bonding agent on one side of said sheet securing same to said sealing surface, and a silicone releasing coating on the other side of said sheet.

2. A sole for thermosealing devices adapted to be secured to the sealing surface of said devices to prevent thermoplastic materials from sticking thereto, comprising, a non-inflammable high-heat-resistant and fluid-permeable base sheet having a pressure adhesive coating on one side thereof, a separable protecting sheet applied over the adhesive coating, and a silicone releasing coating on the other side of said base sheet.

EDWIN C. FICHTNER.

REFERENCES CITED

The following references are of record in the file of this patent:

UNITED STATES PATENTS

| Number | Name | Date |
|---|---|---|
| 2,424,558 | Delano | July 29, 1947 |
| 2,525,070 | Greenwald | Oct. 10, 1950 |

OTHER REFERENCES

Larsen, Silicone Resin Bonded Laminates, Modern Plastics, vol. 23, No. 7, March 1946, pages 160 to 162, 92 to 94.